United States Patent [19]

McDonough

[11] Patent Number: 5,066,318

[45] Date of Patent: Nov. 19, 1991

[54] FILTER ELEMENT GASKET

[75] Inventor: Charles M. McDonough, Stamford, Conn.

[73] Assignee: PCF Group, Inc., Stamford, Conn.

[21] Appl. No.: 508,560

[22] Filed: Apr. 13, 1990

[51] Int. Cl.⁵ ............................................. B01D 29/21
[52] U.S. Cl. ...................................... 55/502; 55/302; 55/498; 55/507; 55/508
[58] Field of Search ................. 55/302, 377, 378, 498, 55/502, 507-509

[56] References Cited

U.S. PATENT DOCUMENTS

| | | | |
|---|---|---|---|
| 3,507,098 | 4/1970 | Veres et al. | 55/502 X |
| 3,616,618 | 11/1971 | Gronholz et al. | 55/502 X |
| 3,708,965 | 1/1973 | Domnick | 55/498 X |
| 4,036,616 | 7/1977 | Byrns | 55/498 |
| 4,038,058 | 7/1977 | Miskiewicz | 55/502 X |
| 4,063,913 | 12/1977 | Kippel et al. | 55/498 X |
| 4,111,815 | 9/1978 | Walker et al. | 55/502 X |
| 4,159,197 | 6/1979 | Schuler et al. | 55/379 |
| 4,261,710 | 4/1981 | Sullivan | 55/502 X |
| 4,526,378 | 7/1985 | Fisher et al. | 55/502 X |
| 4,544,387 | 10/1985 | Agerlid | 55/502 X |
| 4,775,398 | 10/1988 | Howeth | 55/302 |
| 4,787,925 | 11/1988 | Ansite | 55/502 X |
| 4,832,844 | 5/1989 | Ayers | 55/502 X |
| 4,836,834 | 6/1989 | Steele | 55/302 X |
| 4,950,317 | 8/1990 | Dottermans | 55/498 X |

Primary Examiner—Robert Spitzer
Attorney, Agent, or Firm—Barry R. Lipsitz

[57] ABSTRACT

A removable gasket is provided for use in sealing a filter element. A resilient top wall has a central opening. A lip extends transversely from the top wall. The top wall and lip define a cavity to accommodate a filter element. A channel that opens into the cavity is provided in the top wall to accommodate a separate gasket mounted to the filter element.

10 Claims, 2 Drawing Sheets

FILTER ELEMENT GASKET

BACKGROUND OF THE INVENTION

The present invention relates to filtration apparatus, and more particularly to an improved gasket for sealing a filter element.

Various industrial processes, such as powder coated finishing, produce dust and other pollutants that require filtering. One type of filtration system used to provide control of fine particles is a filter cartridge system in which a plurality of cartridge filters are used to treat large volumes of dust laden air on a continuing basis. One such filter cartridge system is the model TD 6120 manufactured by the Torit Division, Donaldson Company, Inc., Minneapolis, Minnesota. This system uses an array of cylindrical filter cartridges containing pleated, non-woven filter media. Dust laden air enters through the inlet of a collector, and heavy particles fall immediately into the bottom of a hopper. As air is drawn in through the filter cartridges, dust is deposited on the outside of the filtering media. The system is capable of handling sub-micron particulate matter, such as that found in powder coated finishing environments.

One problem that has been found with such filter cartridge systems is that the filters have a tendency to leak at the interface between the cartridge and the venturi tube plate to which they are mounted. Conventional gaskets provided to seal the cartridge against the tube plate are not always effective in preventing leakage of particulate matter.

It would be advantageous to provide a gasket that completely seals the area between the cartridge and the tube plate in a filter cartridge system. It would be further advantageous to provide such a gasket that is reusable and easily installed on existing cartridge filter elements without modification.

The present invention provides such a gasket and filter element in combination therewith.

SUMMARY OF THE INVENTION

In accordance with the present invention, a removable gasket is provided for use in sealing a filter element. The gasket includes a resilient top wall having a central opening. A lip extends transversely from the top wall. The top wall and lip define a cavity to accommodate a filter element.

In a preferred embodiment, the cavity defined by the top wall and lip is sized to snugly engage an end of a filter element to be sealed. Preferably, the lip extends entirely around a periphery of the top wall.

In one embodiment, a channel is provided that opens into the cavity in the top wall of the gasket. The channel accommodates a separate gasket mounted to the filter element.

DETAILED DESCRIPTION OF THE INVENTION

Figure 1:
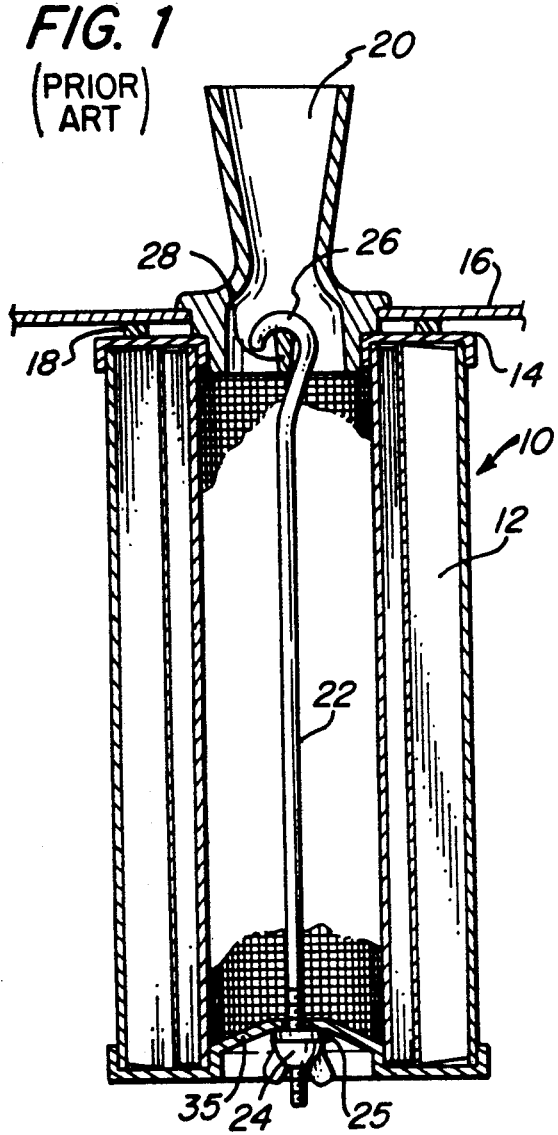
FIG. 1 is a sectional view of a prior art cartridge filter element installed onto the venturi tube plate of a dust collector.

FIG. 1 illustrates a prior art filter cartridge assembly, generally designated 10, installed in a dust collection apparatus. During normal operation, dust enters the apparatus and is collected on the outside of filter element 12. The filtered air passes through the filter element and up through a venturi 20 to a clean air outlet (not shown). The filter cartridge includes an upper flange 14 with an integral gasket 18 that is mounted against a tube plate 16. Gasket 18 is used to form a seal to prevent dust laden air from passing between tube plate 16 and flange 14, where it would contaminate the clean filtered air passing through venturi 20. It has been found, however, that gasket 18 does not always provide an effective seal. This results in contamination of the output air.

As shown in FIG. 1, the filter cartridge is mounted to the dust collection apparatus by a hanger rod 22 having a hook 26 at one end thereof that engages a bracket 28. The other end of hanger rod 22 is threaded and secured at the base 35 of the filter cartridge by a wing nut 24. A gasket 25 may be provided to effect a seal at the base.

Figure 2:
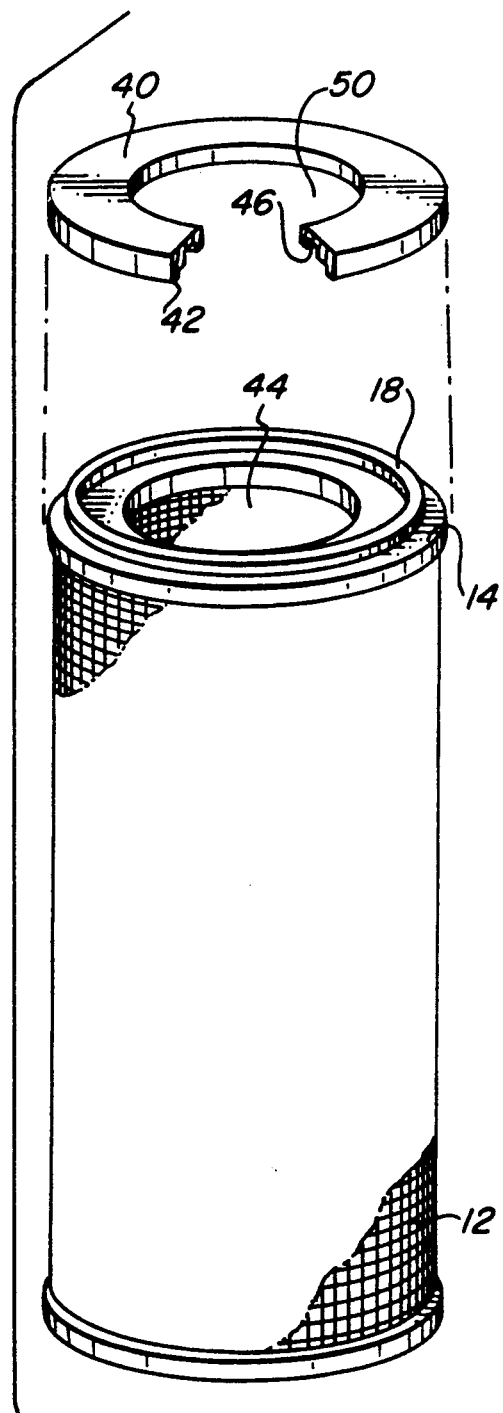
FIG. 2 is an exploded perspective view illustrating how the gasket of the present invention fits on a conventional filter element.

In accordance with the present invention, an improved gasket is provided to effect a complete seal between flange 14 and tube plate 16. As shown in FIG. 2, the gasket of the present invention includes a top wall 40 with a lip 42 extending transversely therefrom. Top wall 40 and lip 42 define a cavity 52 (FIG. 4) to accommodate filter element 12. An opening 50 in the gasket corresponds to the filter cartridge opening 44. A channel 46 in top wall 40 of the gasket opens into cavity 52. The purpose of channel 46 is to accommodate the existing gasket 18 that is glued onto the conventional filter cartridge. Dimensions for the present gasket will depend, in part, on the size of existing gasket 18. Where, for example, the existing gasket is $\frac{1}{2}$" high, top wall 40 will typically be on the order of $\frac{3}{4}$" high. Lip 42 will typically extend $\frac{1}{4}$" below top wall 40, so that the height of the gasket is about 1" overall.

In a preferred embodiment, the inside diameter of the gasket at lip 42 is of a size such that flange 14 fits snugly into the cavity 52. In this manner, proper alignment and centering of opening 50 with respect to opening 44 is provided.

Figure 3:
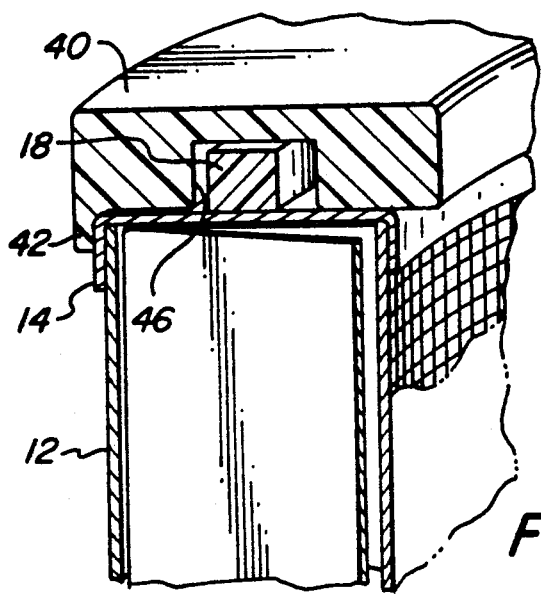
FIG. 3 is a detailed sectional perspective view of a gasket in accordance with the present invention installed on a filter cartridge.
Figure 4:
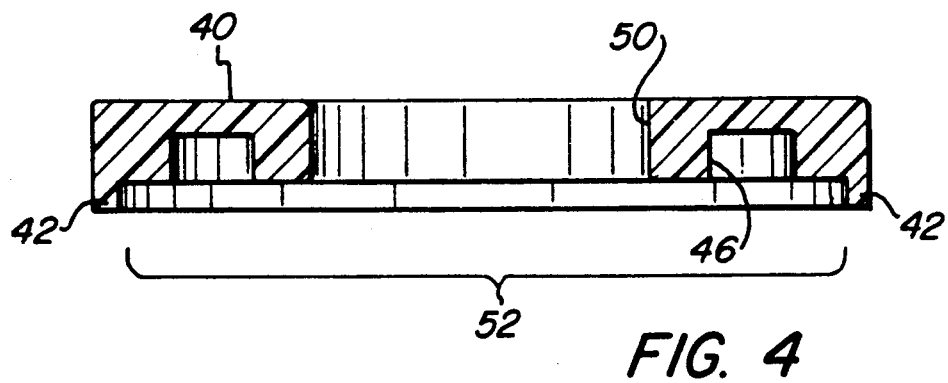
FIG. 4 is a cross-sectional view of one embodiment of a gasket in accordance with the present invention.
Figure 5:
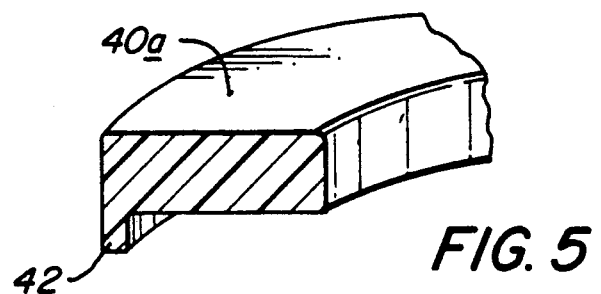
FIG. 5 is a sectional perspective view illustrating another embodiment of a gasket in accordance with the present invention.

FIGS. 2, 3, and 4 all illustrate an embodiment of the present invention wherein the gasket fits over the existing gasket 18 of the filter cartridge. In another embodiment, the existing gasket 18 on the filter cartridge is removed prior to installation of the improved gasket of the present invention. In this case, the gasket of the present invention does not require channel 46, and top wall 40a is fabricated as shown in FIG. 5.

Figure 6:
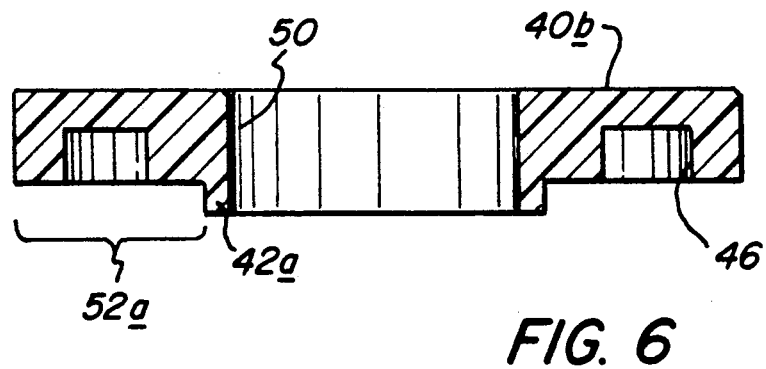
FIG. 6 is a cross-sectional view of another embodiment of a gasket in accordance with the present invention.

In yet another embodiment, the lip can extend from opening 50 instead of from the outer diameter of the gasket. This is shown in FIG. 6, wherein top wall 40b has lip 42a extending transversely therefrom. In this embodiment, top wall 40b and lip 42a define cavity 52a to accommodate the filter element. Channel 46 is necessary only where the gasket is used with a filter cartridge that includes existing gasket 18.

The gasket of the present invention is manufactured from a resilient material, such as silicone rubber. The silicone rubber can be of a type that is electrically conductive, to dissipate static charges. If not eliminated, such static charges can cause sparks that result in dust explosions. Those skilled in the art will appreciate that other resilient materials, both conductive and nonconductive, can be substituted for silicone rubber. It is advantageous to select a resilient material having a good memory, so that the gasket will be reusable. This will avoid the need to purchase a new gasket each time a filter element is changed.

It will now be appreciated that the present invention provides an improved, user installable gasket for effectively sealing a filter element. Although described in connection with a dust collection system, the gasket of the present invention will also find use in liquid applications where an effective seal is required. Since the width of the gasket extends across the entire width of the filter flange, the sealing surface area is maximized for optimum effectiveness.

Although the invention has been disclosed in connection with specific embodiments thereof, those skilled in the art will appreciate that numerous adaptations and modifications may be made thereto without departing from the spirit and scope of the invention, as set forth in the following claims.

I claim:

1. In combination, a filter element for a dust collector having a metal flange to be sealed against leakage and a resilient gasket for sealing said flange against a metal plate, said gasket comprising:

a top wall, having an inner surface adjoining said flange and formed from an electrically conductive resilient material to dissipate static charges from said filter element to a metal plate, said top wall having a broad outer surface opposite said inner surface for sealing against said metal plate;

a lip extending transversely from said top wall and defining a cavity containing said flange; and an opening aligned with a corresponding opening in said flange.

2. The combination of claim 1 further comprising:

a channel in the top wall of said gasket in mating engagement with a separate gasket mounted to said flange.

3. The combination of claim 2 wherein said top wall covers substantially the entire width of said flange.

4. The combination of claim 2 wherein said lip extends entirely around a periphery of said top wall.

5. The combination of claim 1 wherein said top wall covers substantially the entire width of said flange.

6. The combination of claim 5 wherein said gasket comprises electrically conductive silicone rubber.

7. The combination of claim 1 wherein said cavity snugly engages said flange.

8. The combination of claim 7 wherein said lip extends entirely around a periphery of said top wall.

9. The combination of claim 1 wherein said gasket is removable from the flange.

10. The combination of claim 1 wherein said gasket comprises electrically conductive silicone rubber.

* * * * *